(12) United States Patent
Kratz et al.

(10) Patent No.: US 10,932,094 B2
(45) Date of Patent: *Feb. 23, 2021

(54) METHOD AND SYSTEM FOR RADIOLOCATION ASSET TRACKING VIA A MESH NETWORK

(71) Applicant: ZaiNar, Inc., Redwood City, CA (US)

(72) Inventors: Philip A. Kratz, Redwood City, CA (US); Daniel Jacker, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,024

(22) Filed: Apr. 30, 2020

(65) Prior Publication Data
US 2020/0260230 A1    Aug. 13, 2020

Related U.S. Application Data

(63) Continuation of application No. 16/559,495, filed on Sep. 3, 2019, now Pat. No. 10,681,500, which is a continuation of application No. 15/644,717, filed on Jul. 7, 2017, now Pat. No. 10,455,350.

(60) Provisional application No. 62/360,446, filed on Jul. 10, 2016.

(51) Int. Cl.
| | | |
|---|---|---|
| H04M 1/00 | (2006.01) | |
| H04W 4/029 | (2018.01) | |
| H04L 27/22 | (2006.01) | |
| H04W 56/00 | (2009.01) | |
| H04L 29/08 | (2006.01) | |
| H04W 4/02 | (2018.01) | |
| H04W 64/00 | (2009.01) | |
| H04W 84/18 | (2009.01) | |
| H04W 84/12 | (2009.01) | |
| H04W 4/33 | (2018.01) | |

(52) U.S. Cl.
CPC ............. *H04W 4/029* (2018.02); *H04L 27/22* (2013.01); *H04L 67/20* (2013.01); *H04W 4/02* (2013.01); *H04W 56/002* (2013.01); *H04W 64/00* (2013.01); *H04W 4/33* (2018.02); *H04W 84/12* (2013.01); *H04W 84/18* (2013.01)

(58) Field of Classification Search
CPC ......... H04W 4/02; H04W 64/00; H04W 4/33; H04W 84/12; H04W 84/18; H04L 27/22
See application file for complete search history.

(56) References Cited

U.S. PATENT DOCUMENTS

| | | | | |
|---|---|---|---|---|
| 6,738,628 | B1 * | 5/2004 | McCall | G01S 1/68 340/8.1 |
| 7,924,153 | B1 * | 4/2011 | Furey | G08B 1/08 340/286.01 |
| 8,223,009 | B2 * | 7/2012 | Anderson | G06Q 10/025 235/384 |

(Continued)

*Primary Examiner* — Sonny Trinh
(74) *Attorney, Agent, or Firm* — Run8 Patent Group, LLC; Alexander R. Flake; Peter Miller

(57) ABSTRACT

A method of determining a reference clock in a mesh network includes receiving multiple signals, correlating the multiple signals with a local signal generated by the first node to determine a coarse set of time differences, refining the coarse set of time differences using a phase of a carrier signal of the multiple signals to produce a refined set of time differences, and using the refined set of time differences to define a reference clock.

20 Claims, 9 Drawing Sheets

(56) References Cited

U.S. PATENT DOCUMENTS

| | | | | |
|---|---|---|---|---|
| 8,314,704 B2* | 11/2012 | Cova | ............... | G06Q 10/0833 |
| | | | | 340/568.1 |
| 9,110,157 B2* | 8/2015 | Levin | ............... | G01S 19/05 |
| 9,734,480 B2* | 8/2017 | Kerai | ............... | G06Q 10/0833 |
| 10,455,350 B2* | 10/2019 | Kratz | ............... | H04W 56/002 |
| 10,681,500 B2* | 6/2020 | Kratz | ............... | H04L 27/22 |

* cited by examiner

METHOD AND SYSTEM FOR RADIOLOCATION ASSET TRACKING VIA A MESH NETWORK

CROSS REFERENCE TO RELATED APPLICATION

This Application is a continuation application of U.S. patent application Ser. No. 16/559,495, filed on Sep. 3, 2019, which is a continuation application of U.S. patent application Ser. No. 15/644,717, filed on Jul. 7, 2017, which claims the benefit of U.S. Provisional Application 62/360,446 filed on Jul. 10, 2016, all of which are incorporated in their entireties by this reference.

TECHNICAL FIELD

This disclosure relates to a method and system for locating and tracking radio frequency (RF) transmitters associated with assets; more specifically, to radiolocation of RF transmitters using time difference of arrival or frequency difference of arrival (TDoA/FDoA) and multilateration (MLAT) via a mesh network of RF transponders.

BACKGROUND

Global navigation satellite systems (GNSS) are networks of geostationary satellites for geo-spatial positioning using time of arrival (ToA) measurements from line of sight (LoS) radio communications with satellites to calculate position to a high level of accuracy, usually several meters, and simultaneously calculate local time to high precision. The Global Positioning System (GPS) is a GNSS developed and maintained by the US Department of Defense (DoD); other GNSS include GLONASS (Russia), BeiDou (China), GALILEO (Europe), and IRNSS (India). GPS specifically is divided into two classes: SPS, for civilian use, and PPS, for military use which uses two frequencies for ionospheric correction. GPS and GNSS have found myriad uses in civilian, commercial, and military applications for locating and tracking people, goods, and physical capital. However, while standard in many consumer products, including smartphones and automobile navigation systems, GNSS is ineffective at locating in indoor or in urban environments, where the radio signals from the GNSS satellites are blocked by intervening metal or dielectric structures, such as roofs, walls, and windows. Furthermore, implementations of GNSS require LoS radio communications with at least four GNSS satellites, limiting the geographic availability in developing GNSS networks, such as BeiDou and IRNSS, and locations where multipath propagation due to reflections of electromagnetic signals from structures is an issue, such as in urban canyons or indoor environments.

A number of technologies, originally developed for mitigating multipath propagation in radio direction finding applications, have found use in GPS. Since GPS signals are based on sky wave propagation, ground wave attenuation techniques effectively mitigate multipath reflection. An example is choke-ring antennas, developed at NASA Jet Propulsion Laboratory (JPL) and currently licensed by patent holders to Trimble Navigation and Magellan Professional Products for use in GPS receivers.

Radio direction finding (RDF), commonly used in aircraft and marine navigation, such as Decca Navigator Systems and LORAN, in civilian and military applications, as well as amateur radio, is a series of methods for determining the direction or bearing of a radio frequency (RF) transmitter. RDF may be used for determining the location of an RF transmitter, a process called radiolocation, using multilateration (MLAT), based on time difference of arrival or frequency difference of arrival (TDoA/FDoA), or multiangulation, based on angle-of-arrival (AoA). AoA may be determined using directional antennas, such Adcock, Watson-Watt and associated signal processing techniques such as the Butler Matrix, or by measuring phase differences between individual elements in antenna arrays, such as Correlation Interferometry. TDoA/FDoA requires synchronization to a common time base, which is conventionally an absolute time reference with a high level of timing accuracy, such as an atomic clock.

An active area of research and development for market applications are so-called indoor positioning systems (IPS), local positioning system (LPS), and real-time locating systems (RTLS), which use information from a variety of sensors, such as Wi-Fi, Bluetooth, magnetic positioning, infrared, motion sensing, acoustic signals, inertial measurement, LIDAR, and machine vision, to locate physical objects or personnel in indoor environments or urban canyons where traditional GPS is ineffective. These technologies may be complemented with ToA synchronization, such as from using pseudolites or self-calibrating pseudolite arrays (SCPAs), with positional accuracy under 1 meter in some cases. A pseudolite is typically a local, ground-based transceiver used as an alternative to GPS.

IPS may be implemented at choke points, as a dense network of short-range sensors, or long-range sensors based on AoA, ToA, or received signal strength indication (RSSI.) The feasibility and cost-effectiveness of IPS has been increasing with the current and future trend towards larger numbers of indoor antennas at access points for cellular and wireless communications, as in the case of multiple-input and multiple-output (MIMO). This has been driven by the demand for increased coverage indoors and the emerging 5G telecommunications network standard, which will have smaller cell sizes due to the use of higher transmission frequencies with shorter propagation ranges, with the goal of spectrum reuse, and networking of buildings, vehicles, and other equipment for Web access, sometimes informally referred to as the "Internet of Things" or IoT.

Several commercial solutions exist for mobile phone tracking. These are based on tracking of GPS-capable smartphones, Wi-Fi-capable smartphones or feature phones, and cellular positioning. The US government specifies a worst case pseudorange accuracy of 7.8 m at 95% confidence level for GPS. For a 3G iPhone, the positional accuracy for these three techniques has been established at 8 m, 74 m, and ~600 m, respectively. External GPS hardware may be used with smartphones and feature phones for additional positioning accuracy, such as XGPS150A, with a positional accuracy of 2.5 m.

Wi-Fi positioning is currently a developing technology for tracking, and is based on signal tracking of transmissions from wireless devices, wireless access points (WAPs), and routers. Packet monitoring can provide the MAC address of the transmitting device and signal strength through received signal strength indication (RSSI), which may be used for locating the device. Wi-Fi positioning has a propagation range of ~100 m, and at least 1-5 m positional accuracy. This technique is most effective in urban environments with a large number of signals. Wi-Fi positioning has been implemented in systems based on the range of the transmitting device from a receiver or AoA with antenna arrays, which may be implemented on commodity wireless access points (WAPs) by taking advantage of existing MIMO capabilities and developing various additional signal processing capabilities into software, such as multiple signal classification (MUSIC).

The drawbacks with these existing techniques are that they either have extremely limited positional accuracy and coverage indoors, such as GPS/GNSS, are applicable for only certain communication protocols like Wi-Fi positioning, are not robust to data collection artifacts such as machine vision using cameras, or require extensive hardware infrastructures to support like machine vision and Wi-Fi positioning. The latter consideration is especially relevant, as it presents a limiting factor to the market adoption of a particular technology for tracking purposes due to cost and implementation barriers. Furthermore, the accuracy requirements are more stringent for indoor positioning, where it is often desirable to achieve accuracy on the 1 meter scale or smaller to provide location information within a single room in a building.

SUMMARY

One embodiment is a method of tracking a third-party transmitter, in a mesh network of nodes having a common reference clock between nodes. The method includes receiving, at a node, a transmitted signal at a first node from the third-party transmitter, demodulating the transmitted signal at the first node to produce a demodulated local signal, receiving, from at least a second node in the mesh network, a demodulated remote signal, autocorrelating the demodulated local signal and the demodulated remote signal to recover first timing differences between the demodulated remote signal and the demodulated local signal, and using the first timing difference to acquire a location of the third-party transmitter.

Another embodiment is a method of tracking third-party transponders. The method includes receiving, at a receiver located in a defined space, a signal from a previously-unknown, third-party transmitter, assigning an identifier to the third-party transmitter, using radiolocation to track a location of the third-party transmitter using the identifier in the defined space, recording the location and movement data of the third-party transmitter while the third-party transmitter is in the space, and releasing the identifier when the third-party transmitter leaves the space.

Another embodiment is a method of determining a reference clock in a mesh network. The method includes receiving, at a first node in the network, multiple signals from a second node in the mesh network, correlating, at the first node, the multiple signals with a local signal generated by the first node to determine a coarse set of time differences, refining the coarse set of time differences using a phase of a carrier signal of the multiple signals to produce a refined set of time differences, and using the set of time differences to define a reference clock for use in the mesh network.

DETAILED DESCRIPTION OF THE EMBODIMENTS

Figure 1:
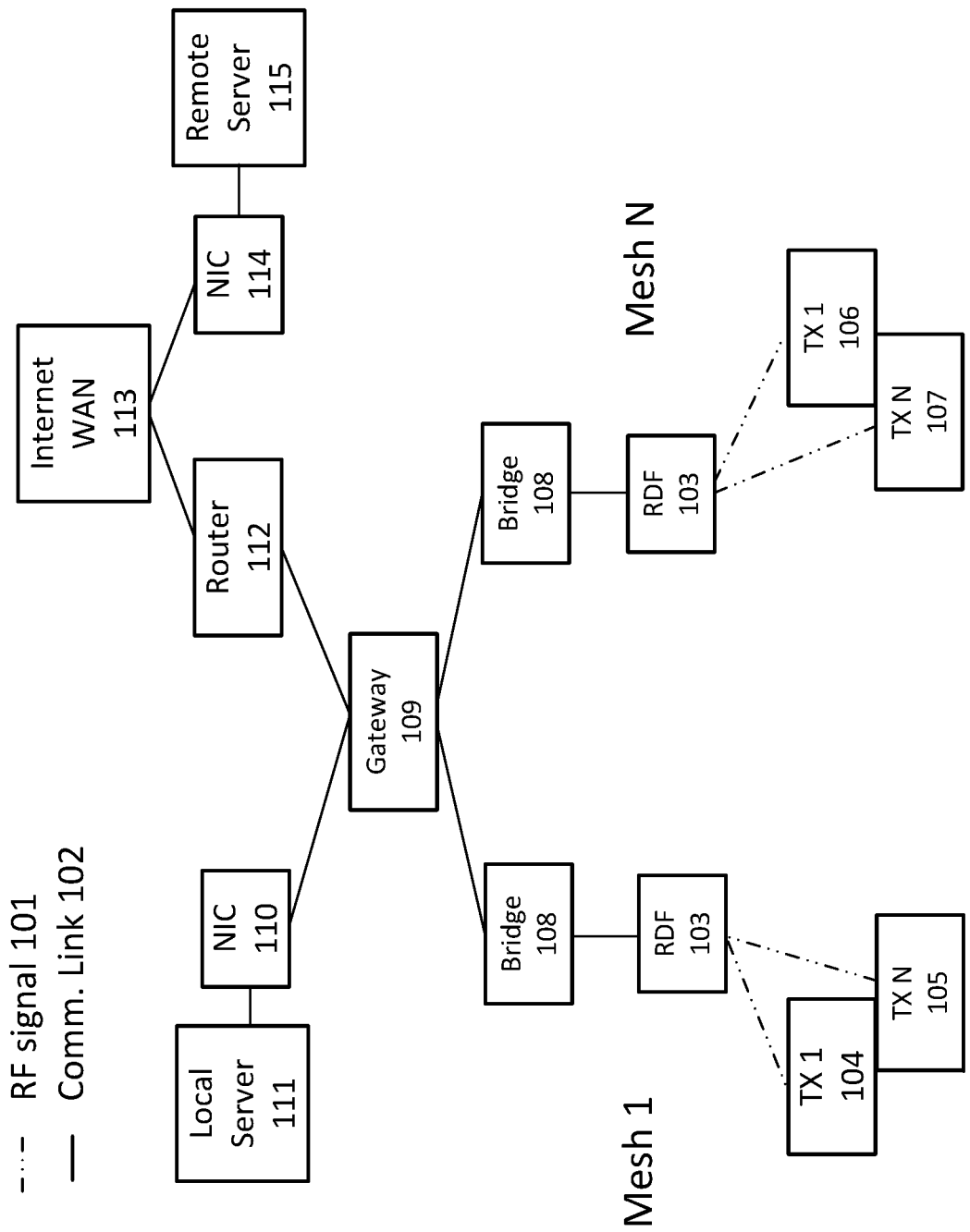
FIG. 1 is an embodiment of system-level block diagram for radiolocation and radio direction finding (RDF) using communications between a plurality of radio frequency (RF) transponders over a mesh network.

The terminology used herein is for describing particular embodiments only and is not intended to be limiting of the scope of the claims. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms, including technical and scientific terms, used herein have the same meaning as commonly understood by one having ordinary skill in the art to which these embodiments belong. It will be further understood that terms, such as those defined in commonly used dictionaries, should be interpreted as having a meaning that is consistent with their meaning in the context of the relevant art and present disclosure and will not be interpreted in an idealized or overly formal sense unless expressly so defined herein.

In describing the embodiments, it will be understood that several techniques and steps are disclosed. Each of these has individual benefit and each can also be used in conjunction with one or more, or in some cases all, of the disclosed techniques. Accordingly, for the sake of clarity, the description will refrain from repeating every possible combination of the individual steps in an unnecessary fashion. Nevertheless, the specification and claims should be read with the understanding that such combinations are entirely within the scope of the embodiments and the claims.

A method for tracking of assets based on data from a radiolocation system with the purpose of identifying both the current location, path, and/or duration in location per asset is described herein. Here, asset includes tracking any item of value or interest, such as but not limited to personnel, mobile phones, or tagged devices which may include radio-frequency tags such as radio frequency identification (RFID) tags. In the following description, for purposes of explanation, numerous specific details and use cases are set forth in order to provide a thorough understanding of the present embodiments. It will be evident, however, to one skilled in the relevant art that the present embodiments may be practiced without these specific details.

The present disclosure is to be considered as an exemplification of the embodiments, and is not intended to limit the scope of the claims to the specific embodiments illustrated in the figures or description below.

The process described in the present embodiments is very valuable as it can be used to enhance practices in many industries including public safety, military security, retail, and supply chain logistics, to name just a few. Below are several examples of how asset tracking using a radio direction finding system over a local area network can be applied.

Example 1: Public Safety

The process can be applied to track people exposed to a dirty bomb in an airport. In one embodiment, the radiolocation mesh network could track all mobile phones that were turned on and within the exposure radius over a designated time period. Then all persons associated with said mobile phones could be contacted and appropriate measures taken to quarantine those exposed in an effort to contain the spread of a potentially contagious biological or chemical agent.

Example 2: Military Base Security

A base set up with the mesh network of radiolocation transponders described in the present embodiments could detect where persons are at all times. Further it could determine if persons carrying phones that are not registered in a central operations database were walking around unescorted. It could also help inform preemptive security protocols as system operators could determine whether someone who is approaching the base from the outside has valid security clearance.

Example 3: Retail Innovation

Retail stores with the network could gain customer segmentation data based on shopping traffic patterns. For example, a store could identify a subset of people who walk in the store that do not make a purchase and then see how long they were in the store and where in the store they walked. They could then use this data to optimize store layout and placement of in-store promotions.

Example 4: Supply Chain Logistics

Assets could be fitted with tags that could be tracked within a warehouse. The network could track assets anywhere within the warehouse up to the receiver range. This could be used to sync inventory management with enterprise resource planning (ERP) systems, reduce inventory shrinkage, and assist with inventory item picking.

The embodiments will now be described by referencing the appended figures representing preferred embodiments. One skilled in the relevant art would appreciate that these various sections can be omitted or rearranged or adapted in various ways.

FIG. 1 shows a functional block diagram of a system-level description for radiolocation and radio direction finding (RDF) using communications between a plurality of radio frequency (RF) transponders in a mesh network. In the embodiments, the transponders 103 nodes in the network may consist of radio frequency (RF) transceivers, digital signal processors (DSPs), field programmable gate arrays (FPGAs), and other hardware and software for determining the locations of a plurality of transmitters (TX) 104-107, which may consist of RF tags or mobile stations (MS), for each mesh network.

As used here, the term 'transponder' indicates a node in the mesh network. The nodes form the mesh network and may have a fixed location, or may move around the location, such as in on a vehicle or other mobile station. The term 'transmitter' may indicate a third-party transmitter of which the mesh network has no prior knowledge, and known transmitters that cooperate with the system. These transmitters may include cell phones with Wi-Fi capability, tablets, computers, RFID tags, etc.

Figure 2:
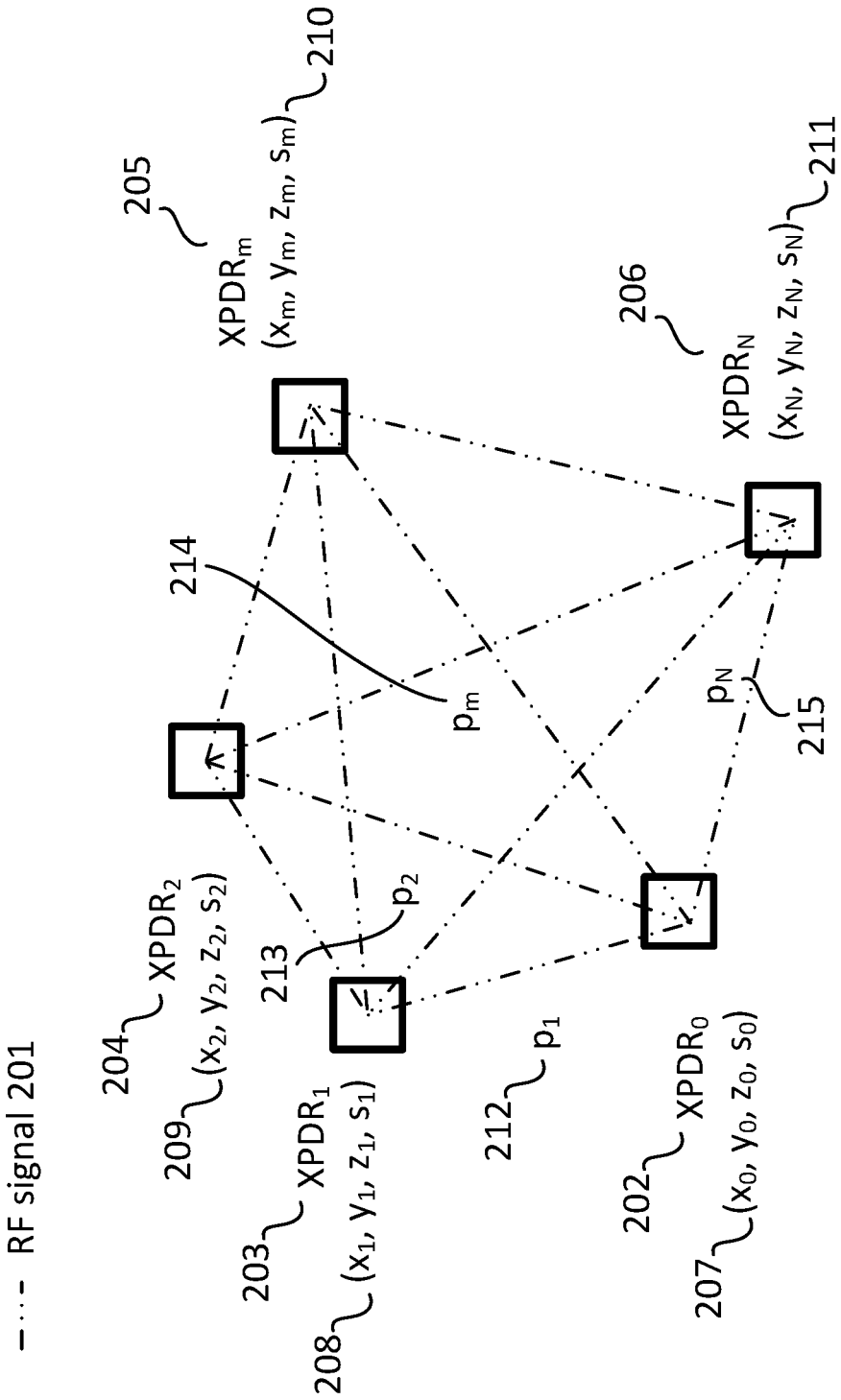
FIG. 2 illustrates time synchronization and establishment of a spatial coordinate system between multiple RF transponders using time of arrival (ToA) measurements.

The TX are located by their RF transmissions 101, which are detected by receiver hardware in the RDF transponders 103, as described in FIG. 2. The RF transponders may use any communication protocol 102, such as TCP/IP over Ethernet and various physical layers such as 802.11 Wi-Fi, Ethernet physical layer (e.g. 10BASE-T, 10BASE2, 10BASE5, 100BASE-TX, 100BASE-FX, 100BASE-T, 1000BASE-T, 1000BASE-SX and other varieties), or Bluetooth, to communicate with network bridges 106 and gateways 107. The network bridges 106 serve to connect multiple network segments, namely the transponder nodes or other hardware with network interface controllers (NICs), to the mesh network. The mesh network may be implemented using hard-wired connections such as Ethernet or fiber optic cables, or wireless uplinks and downlinks using 802.11 Wi-Fi, Bluetooth, or other standard. Further, the RDF transponders may have built-in Wi-Fi or Bluetooth modules, enabling the RDF transponders to act as network routers which establish an ad-hoc local area network (LAN) without need for installing hard-wired connections or separate wireless access points (WAPs).

The network bridges 108 communicate with one or more gateways, which serve to interface the network with a local server 109 via a NIC 110 or a router 112 which provides access to a remote server 115 via a separate NIC 114 over a wide area network (WAN) or the Internet 113. Here, the Internet denotes the global system of interconnected computer networks that use the Internet protocol suite (TCP/IP), and is distinct from the World Wide Web (WWW), which only provides access to web pages and other web resources and is a subset of the network services provided by the Internet. Both the local server 111 and the remote server 115 may be used to store, process, and relay to other computers or devices the data acquired from the local positioning system (LPS) described in the present embodiments.

FIG. 2 shows a method for clock synchronization and spatial registration between a reference transponder (XPDR) 202 and a plurality of spatially separated transponders 203-206 using time of arrival (ToA) or time of arrival (ToA) measurements of radio-frequency (RF) transmissions 201 between the said transponders. A common time standard and coordinate system between the transponders are required correctly determine locations of transmitters based on time difference of arrival or frequency difference of arrival (TDoA/FDoA) data. This may be achieved by sending RF transmissions between the receivers, recording the time in which the signals from other receivers are measured by each receiver, and performing the following calculations, which are similar to those used for GPS/GNSS ranging. The x, y, and z coordinates of a receiver and transmission time are denoted as $(x_i, y_i, z_i, s_i)$ 207-211 where the subscript i denotes the receiver and has the value 1, 2, . . . , n. Unlike in GPS ranging, however, the coordinates of each receiver is known since the coordinate system is defined in relation to the transponder locations.

The true reception time $t_i$ is not directly measurable due to timing errors in the on-board clock in the transponder, so the apparent reception time $t_{i,a}$ is corrected by a clock bias factor $b_i$ in the receiver clock to provide self-consistent results. The distance traveled by a transmission from transmitter i is $(t_{i,a}-b_i-s_i)c$, where c is the speed of light at which the transmission travels. For n receivers, the self-consistency equations that must be satisfied are:

$$(x-x_i)^2+(y-y_i)^2+(z-z_i)^2=([t_{i,a}-b_i-s=i]c)^2, i=1,2,\ldots,n$$

or, equivalently, in terms of pseudoranges 212-215, $p_i=(t_{i,m}-s_i)c$, as $$\sqrt{(x-x_i)^2+(y-y_i)^2+(z-z_i)^2}+b_ic=p_i$$

If the absolute spatial coordinates $x_i$, $y_i$, and $z_i$ and clock bias factors $b_i$ are required for each receiver, then a minimum of five separate measurements are required to uniquely solve the self-consistency relations (given that reported values of $s_i$ may be inaccurate due to processing delays and time jitter.) However, for a relative coordinate system, $x_i$, $y_i$, and $z_i$ are taken to be equal to defined values for each receiver and only the clock bias factors $b_i$ have to be determined, requiring only two receivers. When the number of receivers, n, is greater than the number of unknown quantities, the system of self-consistency equations is overdetermined and must be optimized with a fitting method, such as least-squares or the iterative Gauss-Newton method. Error bounds for the calculated position may be determined using statistical methods (e.g., Cramer-Rao bound for maximum likelihood estimation).

Figure 3:
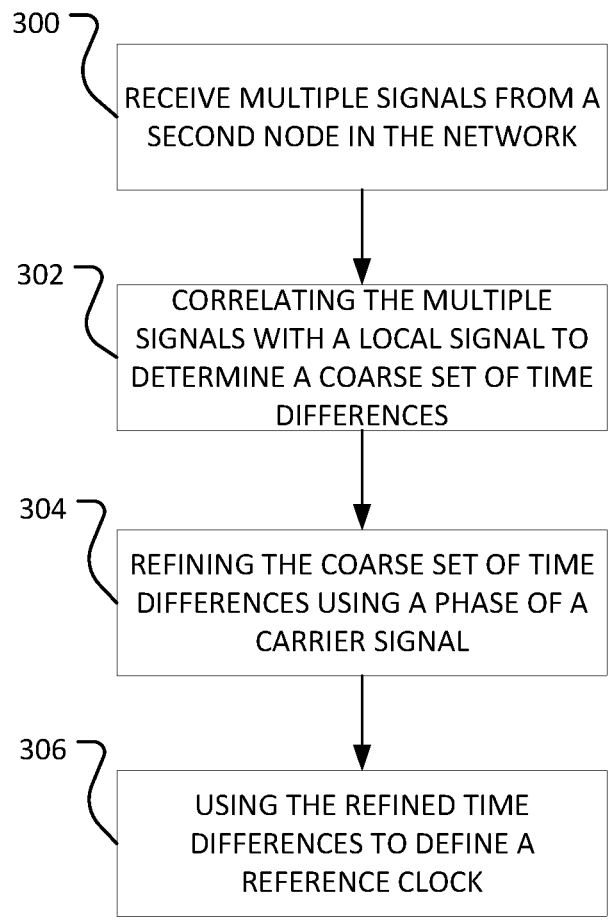
FIG. 3 shows an embodiment of a method to define a reference clock.

FIG. 3 shows an embodiment of a method for determining a reference clock. The process shown in FIG. 3 occurs at one of the nodes of a mesh network. At 300, the node receives multiple signals from a second node in the mesh network. The first node then correlates the multiple signals with a local signal generated by the first node to determine a coarse set of time differences at 302. The node then refines the coarse set of time differences using a phase of a carrier signal of the multiple signals to produce a refined set of time differences at 304. The process then uses the refined set of time differences to define a reference clock for use in the network at 306.

The signals received at the first node will typically be pseudorandom ranging codes from the second node. The first node generates its own pseudorandom ranging codes that it then uses to perform the correlation. The node demodulates the local signal to locate a local signal peak and then demodulating the multiple signals to locate multiple signal peaks. The node then correlates the local signal peaks and the multiple signal peaks to determine an offset for the second node. The node then using the offset for the second node to determine a coarse set of time differences.

In one embodiment, refining the coarse set of time differences involves determining a frequency and phase of the carrier signal. The node then uses the frequency and phase of the carrier signal to determine a fractional offset between carrier signal and the coarse set of time differences. This is then used to determine a fractional offset to adjust the coarse set of differences to a higher level or precision than the coarse set of differences.

The discussion above focuses on two nodes. It is possible that this embodiment can be employed in a network having multiple nodes. The node receives multiple signals from at least a third node in the mesh network and performing the correlating, the refining and the using for at least the third node. Each node in the network may perform this correlation between each other node.

Figure 4:
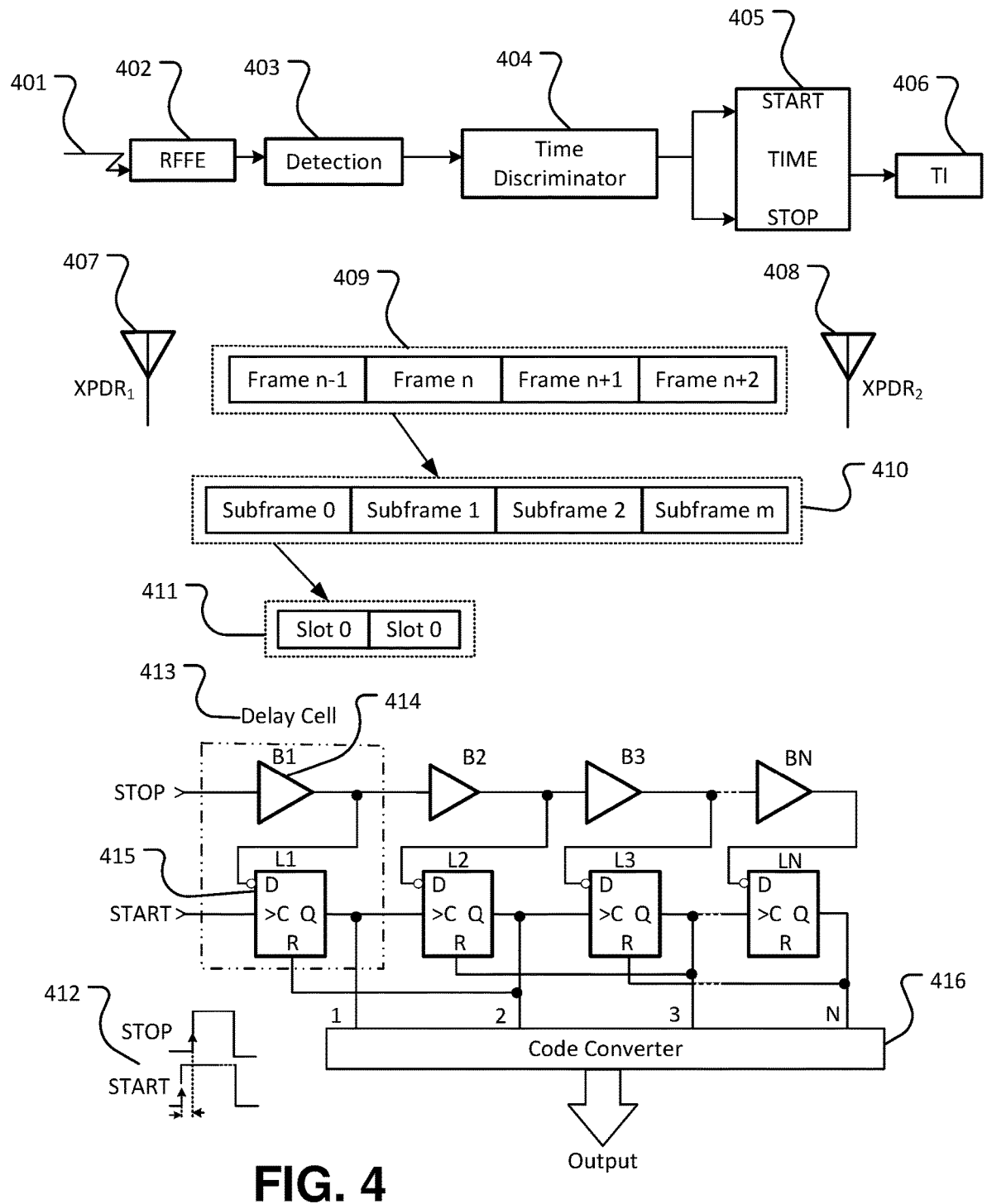
FIG. 4 illustrates an embodiment of a method for time synchronization between multiple RF transponders using time interval (TI) measurements with a time-to-digital converter (TDC).

FIG. 4 illustrates another technique for time synchronization between said transponder nodes in the mesh network, which is to be compared to FIG. 2, using time interval (TI) measurement. In preferred embodiments, this may be implemented with a time-to-digital converter (TDC), which converts the TI into a corresponding digital signal. A radio frequency (RF) front end (RFFE) 402 is used to downconvert the incoming RF signal 401 to baseband frequencies, which are chosen per application, communication standard, and corresponding RF spectrum bands. A time discriminator 404 outputs pulses corresponding to the start and end of the time synchronization communication, based on chosen recognition events for the signal. For example, in the case of packet communication, the start and end of the time interval 406 may correspond to a series of training symbols in the subframe of a packet header or trailer 409-411, which may be recognized with an appropriate detection algorithm 403, such as Schmidl-Cox detection. In some embodiments, the time interval itself may be measured using a non-interpolating time interval meter (TIM) 405. The TIM may be implemented with the dual interpolation method on a differential (Vernier) tapped delay line, consisting of two delay lines with N delay cells and the output decoder. The delay cells each consist of a D flip-flop latch L 415 having a delay $\tau_1$ between the input, D, and the output, Q, for the first delay line; the second delay line has a series of non-inverting buffers 414 with delay $\tau_2<\tau_1$. The input TI is determined by the time interval between the rising edges of the START and STOP pulses 412, with the value being coded by the position M of the last cell in which the rising edge (L→H) at the input C is ahead of that at input D. The TI is then represented as a 1 out of N code, or one-hot encoding. A binary representation 417 is then obtained with a code converter 416. In various embodiments, the TDC may be implemented on a complementary metal oxide semiconductor (CMOS) field programmable gate array (FPGA) technology, with the code converter being implemented with an array of multiple input OR gates. The TDC described here is an example of a flash TDC, in which no internal processing is required for a TI measurement. Additionally, sampling for digital-to-analog (DAC) conversion adds a negligible overhead in the conversion time, allowing time resolutions of >100 ps, or a positioning resolution of >3 cm, in various embodiments.

Figure 5:
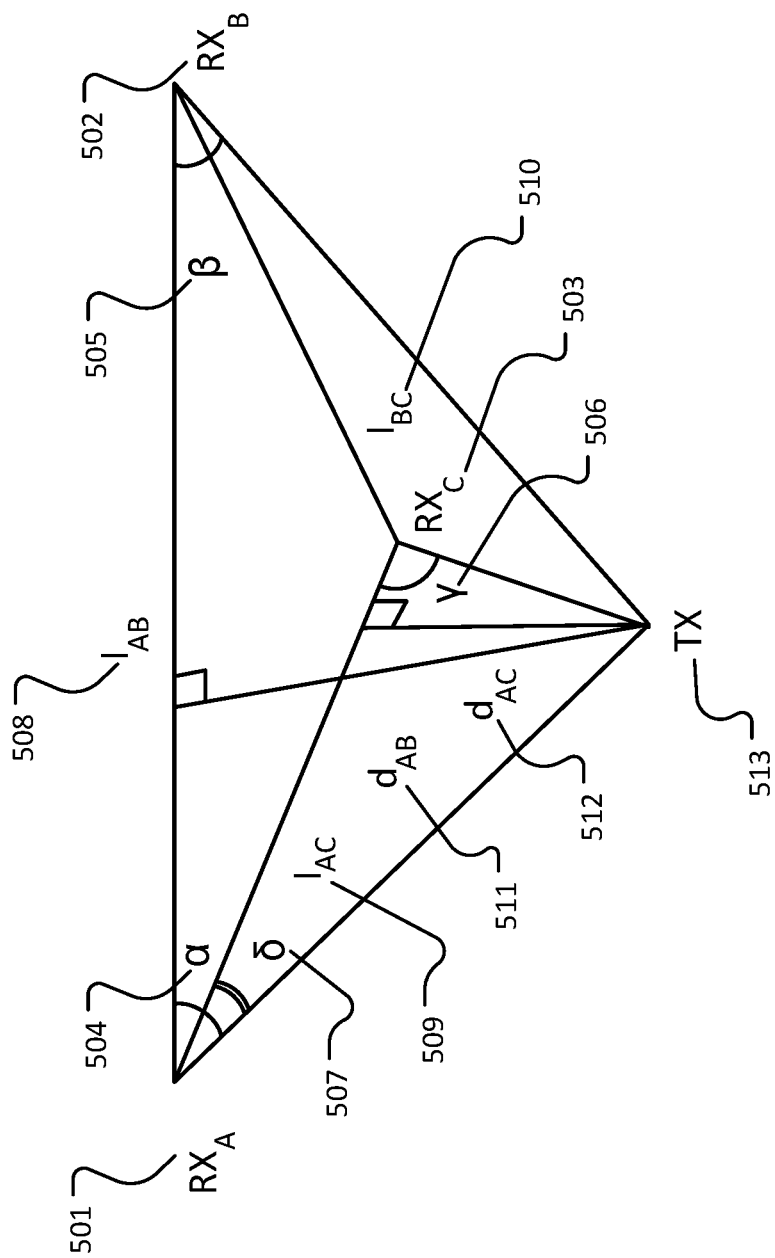
FIG. 5 illustrates embodiments of the geometry of multiangulation radio direction finding (RDF).

FIG. 5 illustrates the geometry of a multiangulation calculation for radio direction finding (RDF) of a radio-frequency (RF) transmitter using two or more receivers, according to various embodiments. This example calculation consists of two or more receivers depicted as but not limited to three receivers 501-503, angles 504-507 relative to the receivers for the incident signals from the transmitter 513, known distances 508-510o between the receivers which may be determined from time of arrival (ToA) measurements as illustrated in FIGS. 2-3, and calculated positions 511-512 relative to the vectors between the receivers 508-510. The two calculated positions $d_{AB}$ and $d_{AC}$ 511-512 (or combinations involving $d_{BC}$), relative to the vectors between the receivers 508-510, uniquely determine the location of the transmitter in three-dimensional space. This technique may be used with only two receivers, as in triangulation, or more than two receivers, as in multiangulation, in which the former may be used to determine two-dimensional coordinates of a transmitter and the latter is preferred in applications where the full three-dimensional (3D) coordinates of the transmitter are required. It can be shown that the calculated positions 511-512 are given by $$d_{AB} = l_{AB} \frac{\sin(\alpha)\sin(\beta)}{\sin(\alpha + \beta)}$$

$$d_{AC} = l_{AC} \frac{\sin(\delta)\sin(\gamma)}{\sin(\delta + \gamma)}$$

Figure 6:
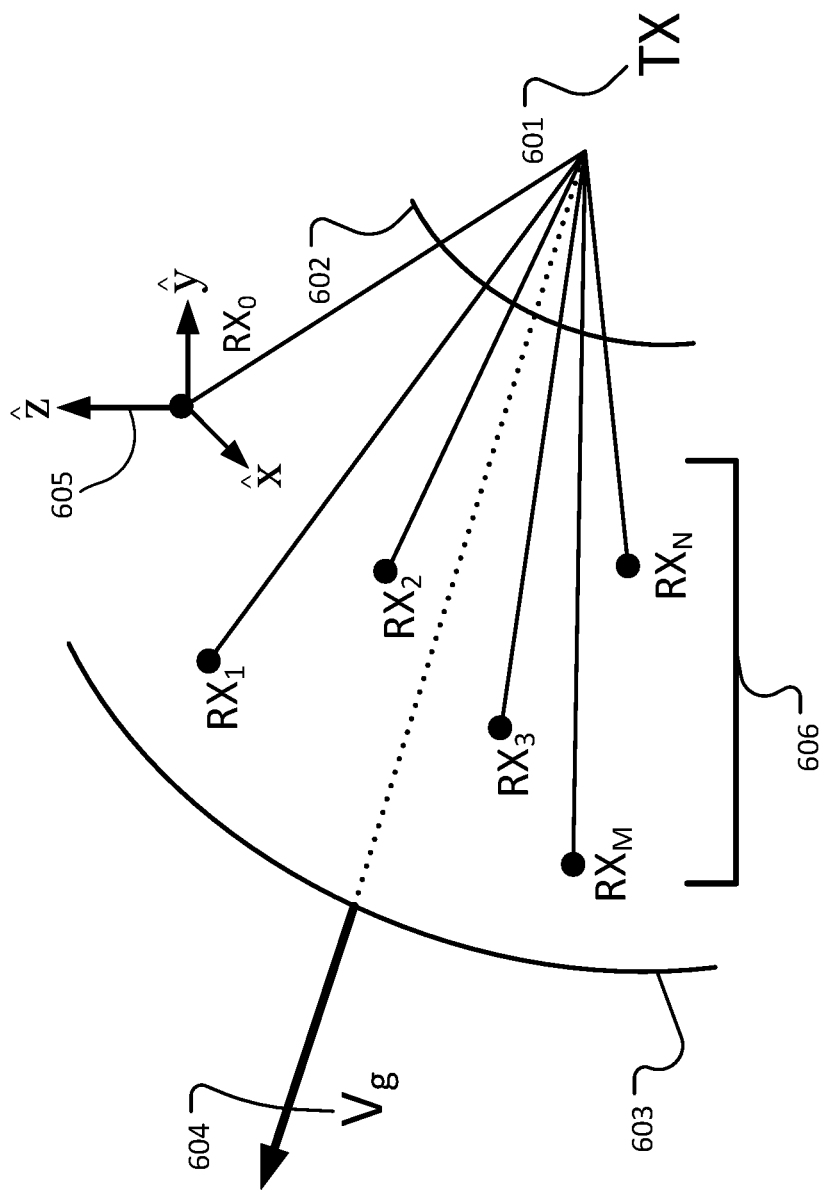
FIG. 6 illustrates embodiments of the geometry of multilateration (MLAT) radiolocation using time difference of arrival/frequency difference of arrival (TDoA/FDoA).

FIG. 6 illustrates the geometry for a multilateration (MLAT) calculation for radiolocation of a radio-frequency (RF) transmitter using four or more receivers 606 to uniquely determine the three-dimensional coordinates 605 of the transmitter 601, or fewer than four receivers to determine the approximate location of the transmitter, according to various embodiments. The RF signal will propagate outwards from the transmitter 602-603 and may be detected by the receivers at different times, depending on whether the receivers are located at different distances from the source of the signal. MLAT is based on the measured time difference of arrival or frequency difference of arrival (TDoA/FDoA) of a signal from a transmitter measured by receivers at known locations. The location of the transmitter may be calculated uniquely from TDoA/FDoA measurements from four or more spatially separated receivers, in which the coordinates of the transmitter are determined by the locus of the hyperboloid sets of possible emitter locations. Denoting the transmitter location vector as E=(x,y,z), and the known receiver locations as $P_0, P_1, \ldots, P_m, \ldots, P_N$, the distance $R_m$ between the transmitter and one of the receivers in terms of the coordinates is $$R_m = \sqrt{(x_m-x)^2+(y_m-y)^2+(z_m-z)^2}$$

$$R_0 = \sqrt{x^2+y^2+z^2}$$

where $R_0$, for simplicity, is taken to correspond to the receiver location $P_0$ being located at the origin. The TDoA equation for receivers o and m is $$c t_m = c T_m - c T_0 = R_m - R_0$$

where c is the speed of light at which the transmission travels 604. This system of equations may be solved by the iterative Gauss-Newton method or Gaussian elimination by forming the system of equations $$A_m = \frac{2x_m}{c\tau_m} - \frac{2x_1}{c\tau_1}$$

$$B_m = \frac{2y_m}{c\tau_m} - \frac{2y_1}{c\tau_1}$$

$$C_m = \frac{2z_m}{c\tau_m} - \frac{2z_1}{c\tau_1}$$

$$D_m = c\tau_m - c\tau_1 - \frac{x_m^2+y_m^2+z_m^2}{c\tau_m} + \frac{x_1^2+y_1^2+z_1^2}{c\tau_1}$$

for the receivers $2 \leq m \leq N$ and the TDoA equation for receiver o $$c\tau_1 + 2r_0 + \frac{r_0^2 - r_m^2}{c\tau_m} = 0$$

Figure 7:
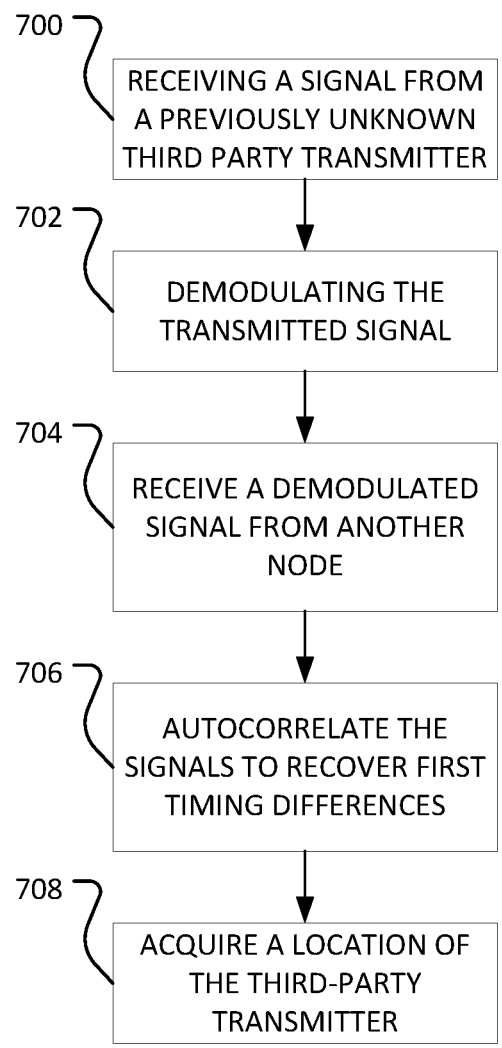
FIG. 7 shows an embodiment of a method of detecting and tracking a previously-unknown, third-party transmitter.

FIG. 7 shows an embodiment of a method of locating a third-party, previously-unknown transmitter using transponders in a mesh network at 700. The node receives a transmitted signal from a previously-unknown, third-party transmitter. The node then demodulates the transmitted signal at the first node to produce a demodulated local signal at 702. The first node then receives from at least one other node in the network another demodulated signal, referred to here as a demodulated remote signal at 704. At 706, the node autocorrelates the demodulated local signal and the demodulated remote signal to recover first timing differences between the demodulated remote signal and the demodulated local signal. The node then uses the first timing difference to acquire a location of the third-party transmitter at 708.

Other processes may occur as part of the overall process of FIG. 7. The node may store the demodulated signal, for example. In addition, the nodes may pass the demodulated local signals to other nodes. The third-party transmitters will more than likely not transmit pseudorandom ranging codes, but may instead transmit random data streams with low correlations between data sampled from a data stream at different times. Further, similar to the refinement in the communications between nodes, the carrier signal may be used to refine the first timing differences by using the frequency and phase of the carrier signal to determine a fractional offset between the carrier signal and the first timing differences, and then using the fractional offset to adjust the first timing differences to a higher level or precision than the coarse set of differences. As also discussed previously, this process may occur between multiple nodes.

Figure 8:
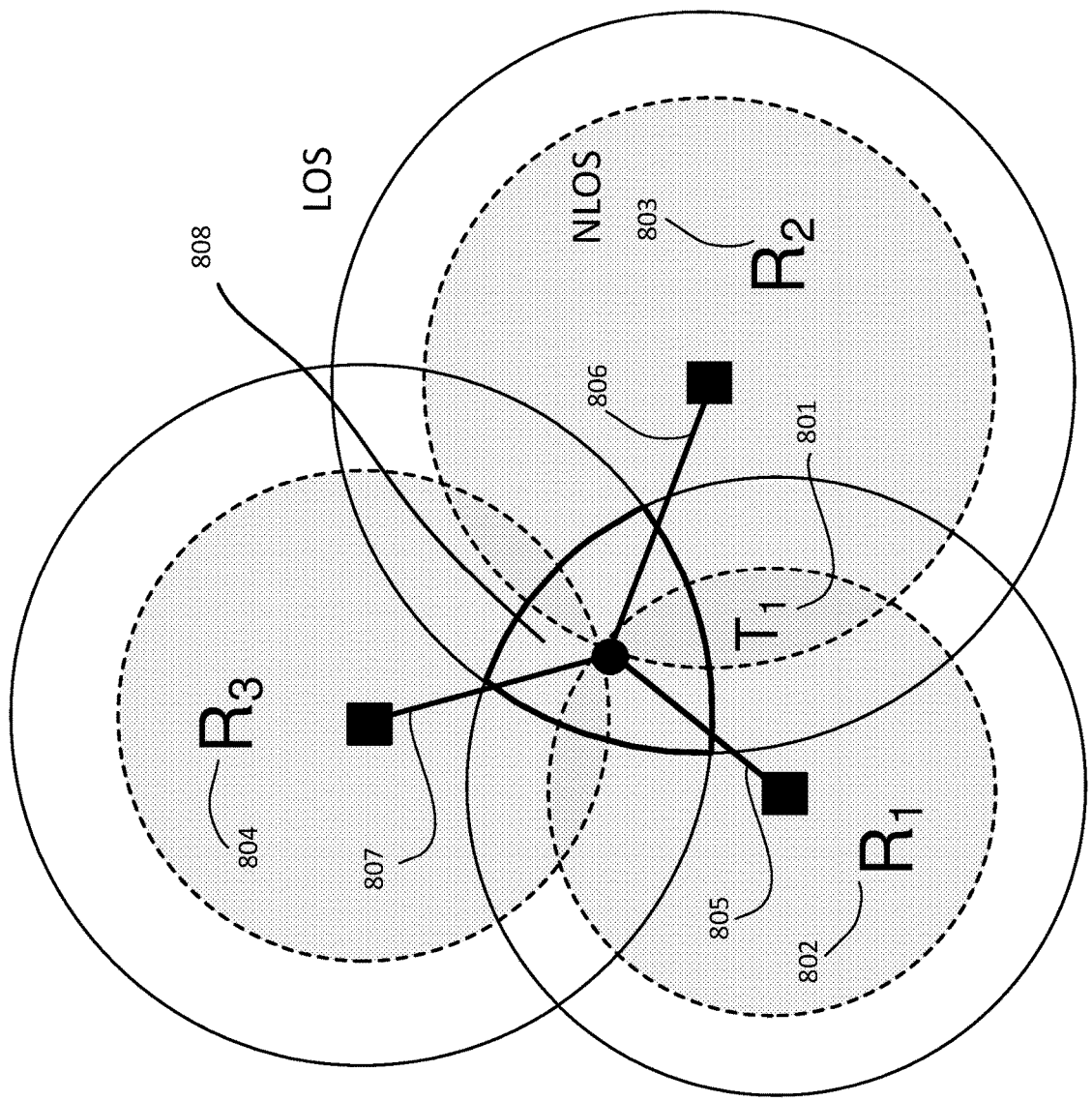
FIG. 8 depicts embodiments of a calculation of the three-dimensional bounding volume for the location of the transmitter in the case of multipath propagation.

FIG. 8 depicts the calculation of the three-dimensional bounding volume for the location of the transmitter in the case of multipath propagation when direct line-of-sight (LoS) transmission is not available due to obstructions in the operating environment, which may reflect or impede the radio-frequency (RF) transmission, according to various embodiments. This technique is useful for determining the approximate location of a transmitter when multilateration (MLAT) or multiangulation fail, which require discrimination of the direct LoS transmission. The figure depicts the transmitter 801, the three receivers 802-804, the calculated angle of arrival (AoA) headings from multiangulation 805-807, and the bounding volume 808.

The AoA headings 805-807 may be inaccurate due to reflections of the RF transmission in the environment, but may be compared with the present calculations to check for consistency and improve the accuracy of the method. For direct LoS propagation with no obstructions, the signal will propagate equally well in all directions in space and will therefore trace out a spherical wavefront with radius $(t_{i,m} - b_i - s_i)c$, where c is the speed of light at which the transmission travels, $t_{i,m}$ is the apparent reception time of the signal by a receiver i, and $b_i$ is the clock bias factor of the receiver. In the case of multipath propagation, the transmitter location will be within, but not outside, the spherical region for each receiver. The bounding volume 823 of the transmitter is therefore given by the locus of the intersecting volume between the spherical regions for each transmitter. The technique is provided here as an example implementation of a fuzzy locating system and may be complemented with other techniques, such as statistical or adaptive methods.

Figure 9:
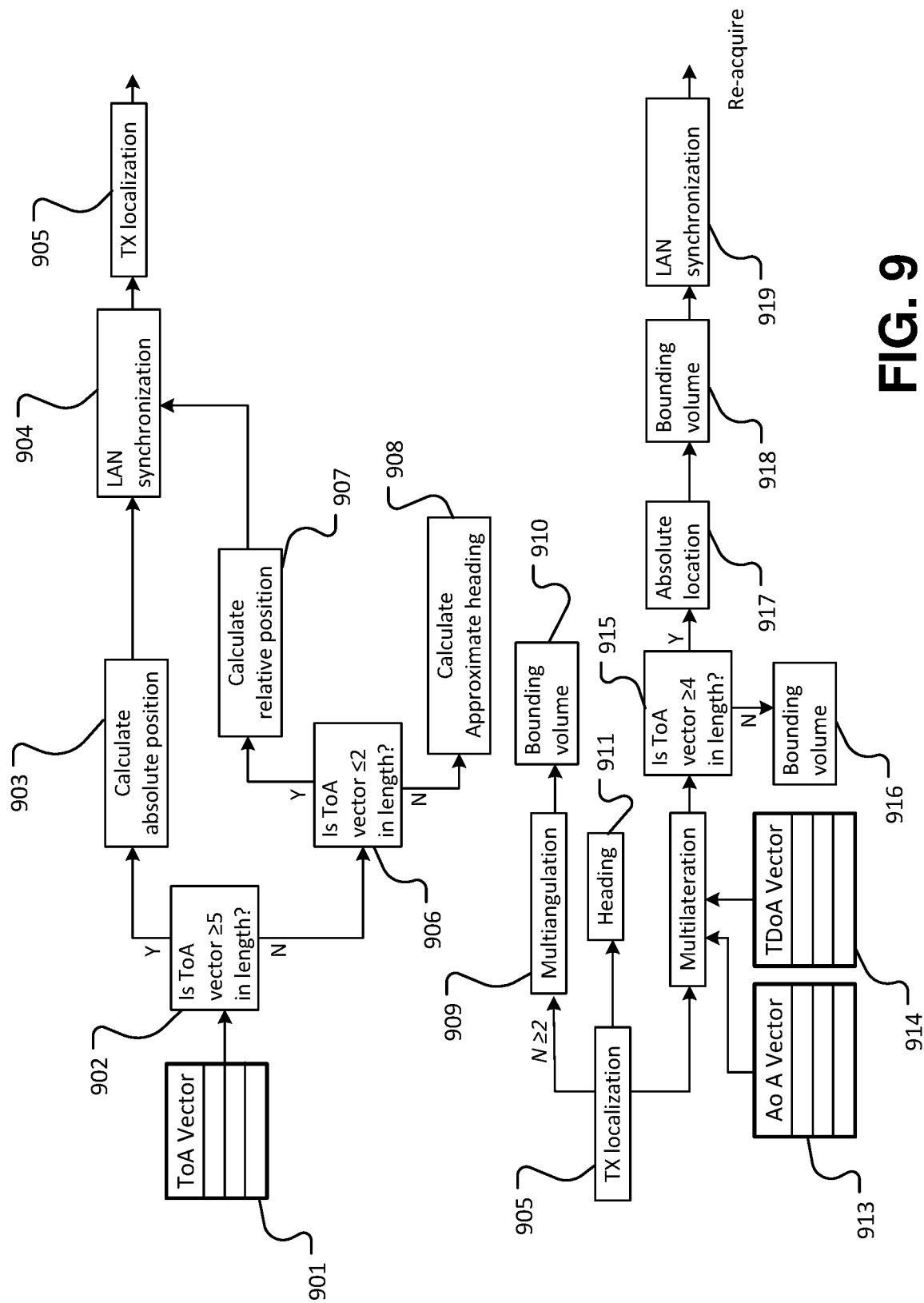
FIG. 9 shows embodiments of system configurations for determining the spatial locations of transmitters for different numbers of receivers, according to various embodiments.

FIG. 9 is a flow diagram showing various system configurations for determining the spatial locations of transmitters (TX) for different numbers of transponders in the mesh network, according to various embodiments. It may be advantageous in various implementations to have fewer transponders in the mesh network due to cost or space considerations. The method described in the present embodiments may be implemented with as few as one transponder, but provides additional radio location accuracy with more transponders in the network. The process for locating an RF transmitter may be divided into two main stages: establishing a common spatial coordinate and time base for the transponder in the mesh network, and applying radiolocation techniques to locate the transmitter based on data acquired from each transponder. For a network of N transponders, a vector of time of arrival (ToA) data 901 is acquired for each transponder relative to all others in the network. This is accomplished by sending an RF transmission originating from each other transponder in the network to each receiver in turn.

If the number of TDoA measurements between transponders $N_m \geq 5$ for a given synchronization, 902, which is possible when $N \geq 4$, the receiver may calculate its absolute position 903 based on the ToA data from the other transponders in the network, following the procedure described in FIG. 2. Failing this condition, if $N \geq 2$, the relative position of the receiver may be calculated using the procedure described in FIG. 2. If N=1, then the heading of the transponder may be determined based on angle of arrival (AoA) data from other RF transmissions, or other methods such as an electronic compass utilizing a magnetometer or fiber optic gyrocompass, or defined to a set value, and is not limited to these methods. The receiver exchanges data with other transponders in the network 904 to establish a common spatial coordinate and time base.

The second stage of the process described in the embodiments is transmitter localization 905, which is achieved using various radiolocation techniques. If $N \geq 2$, multiangulation of the transmitter 909 is attempted using a vector of angle of arrival (AoA) data 913, using the procedure described in FIG. 3, which may be used to determine the absolute position of the transmitter. If $N \geq 4$, multilateration (MLAT) may also be used to determine the absolute position of the transmitter. In all cases, a three-dimensional (3D) bounding volume for the possible locations of the transmitter may be constructed 910, 916, 918, as described in FIG. 5, or a fuzzy location estimate using, for example, statistical or adaptive methods.

The bounding volume calculation provides an approximate location of the transmitter and is more robust against effects from electromagnetic (EM) interference, multipath propagation, receiver noise, and network failures, all of which complicate the application of various radiolocation procedures. Once the position, or a set of possible positions, for the transmitter is determined, the data is sent over the mesh network 919 to additional gateways, bridges, or routers, which allow communication with other networks or remote servers via the Internet. The entire procedure in FIG. 6 or 7 is repeated frequently as desired to acquire positional data on the transmitter as a function of time over different measurement intervals.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
generating a local signal;
demodulating the local signal to detect a local signal peak;
receiving a set of remote signals from a node in a network;
demodulating the set of remote signals to detect a set of remote signal peaks;
calculating a set of time differences based on a correlation between the local signal peak and the set of remote signal peaks; and
updating a reference clock of the network based on the set of time differences.

2. The method of claim 1:
wherein each of the set of remote signals comprises a carrier signal characterized by a frequency and a phase; and
wherein defining the reference clock of the network based on the set of time differences comprises:
refining the set of time differences based on the frequency and the phase of the carrier signal of each of the set of remote signals to generate a refined set of time differences; and
defining the reference clock of the network based on the refined set of time differences.

3. The method of claim 2, wherein refining the set of time differences comprises:
detecting the frequency and the phase of the carrier signal of each of the set of remote signals;
calculating a fractional offset between the carrier signal of each of the set of remote signals and the set of time differences based on the frequency and the phase of the carrier signal of each of the set of remote signals; and
refining the coarse set of differences based on the fractional offset between the carrier signal of each of the set of remote signals and the set of time differences.

4. The method of claim 1, wherein receiving the set of remote signals comprises receiving the set of remote signals comprising pseudorandom ranging codes.

5. The method of claim 1, further comprising:
receiving a second set of remote signals from a second node in the network;
demodulating the second set of remote signals from the second node to detect a set of remote signal peaks corresponding to the second node;
correlating the local signal peak and the set of remote signal peaks corresponding to the second node to calculate a second set of time differences; and
defining the reference clock of the network based on the set of time differences and the second course set of time differences.

6. The method of claim 1, further comprising:
receiving, at the first node, a first transmitted signal from a third-party transmitter;
demodulating the first transmitted signal to produce a first demodulated transmitted signal;
receiving, from a node in the network, a second demodulated transmitted signal derived from the first transmitted signal received at the node;
autocorrelating the first demodulated transmitted signal and the second demodulated transmitted signal to recover a first timing difference between the first demodulated transmitted signal and the second demodulated transmitted signal based on the reference clock of the network; and
estimating a location of the third-party transmitter based on the first timing difference.

7. A method comprising:
generating a local signal;
demodulating the local signal to detect a local signal peak;
receiving a set of remote signals from a node in a network;

demodulating the set of remote signals to detect a set of remote signal peaks;
calculating a set of time differences based on a correlation between the local signal peak and the set of remote signal peaks;
updating a reference clock of the network based on the set of time differences;
receiving a first transmitted signal from a transmitter;
demodulating the first transmitted signal to produce a first demodulated transmitted signal;
receiving, from the node in the network, a second demodulated transmitted signal derived from the first transmitted signal received at the node;
autocorrelating the first demodulated transmitted signal and the second demodulated transmitted signal to recover a first timing difference between the first demodulated transmitted signal and the second demodulated transmitted signal based on the reference clock of the network; and
estimating a location of the transmitter based on the first timing difference.

8. The method of claim 7, further comprising transmitting the first demodulated transmitted signal to the node.

9. The method of claim 7, further comprising, at the node:
receiving the first transmitted signal from the third-party transmitter; and
demodulating the first transmitted signal to produce the second demodulated transmitted signal.

10. The method of claim 7, further comprising refining the first timing difference based on a carrier signal of the first transmitted signal.

11. The method of claim 7:
further comprising:
receiving, from a second node in the network, a third demodulated transmitted signal derived from the first transmitted signal received at the second node;
receiving, from a third node in the network, a fourth demodulated transmitted signal derived from the first transmitted signal received at the third node;
autocorrelating the first demodulated transmitted signal and the third demodulated transmitted signal to recover a second timing difference between the first demodulated transmitted signal and the third demodulated transmitted signal based on the reference clock of the network; and
autocorrelating the first demodulated transmitted signal and the fourth demodulated transmitted signal to recover a third timing difference between the first demodulated transmitted signal and the fourth demodulated transmitted signal based on the reference clock of the network; and
wherein estimating the location of the third-party transmitter comprises estimating the location of the third-party transmitter in three dimensions based on the first timing difference, the second timing difference, and the third timing difference.

12. A method comprising:
for a first node in a network:
generating a first local signal;
demodulating the first local signal to detect a first local signal peak in a pair of local signal peaks;
receiving a first remote signal from a second node in the network; and
demodulating the first remote signal to detect a first remote signal peak in a pair of remote signal peaks;
for a second node in the network:
generating a second local signal;
demodulating the second local signal to detect a second local signal peak in the pair of local signal peaks;
receiving a second remote signal from the first node; and
demodulating the second remote signal to detect a second remote signal peak the pair of remote signal peaks;
based on the pair of local signal peaks and the pair of remote signal peaks:
calculating a time offset between the first node and the second node; and
calculating a distance between the first node and the second node;
receiving, at the first node, a first transmitted signal from a transmitter;
demodulating the first transmitted signal at the first node to produce a first demodulated transmitted signal;
receiving, from the second node, a second demodulated transmitted signal derived from the first transmitted signal received at the second node;
autocorrelating the first demodulated transmitted signal and the second demodulated transmitted signal to recover a first timing difference between the first demodulated transmitted signal and the second demodulated transmitted signal based on the time offset between the first node and the second node; and
estimating a location of the transmitter based on the first timing difference and the distance between the first node and the second node.

13. The method of claim 12, wherein receiving, at the first node, the first transmitted signal from the transmitter comprises receiving, at the first node, the first transmitted signal from a third-party transmitter, the first transmitted signal comprising a wireless data stream.

14. The method of claim 12, wherein receiving, at the first node, the first transmitted signal from the transmitter comprises receiving, at the first node, the first transmitted signal from the transmitter, the first transmitted signal comprising a pseudorandom ranging code.

15. The method of claim 12, wherein estimating the location of the transmitter based on the first timing difference and the distance between the first node and the second node comprises calculating a three-dimensional bounding volume for the transmitter based on the first timing difference and the distance between the first node and the second node.

16. The method of claim 12 further comprising:
at the first node and at the second node, detecting a carrier phase offset of the first transmitted signal to generate a pair of carrier phase offsets; and
refining the location of the transmitter based on the pair of carrier phase offsets.

17. The method of claim 12:
wherein the first node comprises a first cellular site;
wherein the second node comprises a second cellular site;
wherein the network comprises a cellular network; and
wherein the transmitter comprises a mobile phone.

18. The method of claim 12:
wherein the first node comprises a first low-Earth orbit satellite;
wherein the second node comprises a second low-Earth orbit satellite; and
wherein the network comprises a geolocation system.

19. The method of claim 12, further comprising:
associating the transmitter with an identifier based on the first transmitted signal;

associating subsequently-received transmitted signals from the transmitter with the identifier; and recording location data and movement data of the transmitter based on the subsequently-received transmitted signals and the identifier.

20. The method of claim 12, wherein receiving, at the first node, the first transmitted signal from the transmitter comprises receiving, at the first node, the first transmitted signal from a third-node in the network.

* * * * *